United States Patent
Ooi et al.

(10) Patent No.: US 8,331,779 B2
(45) Date of Patent: Dec. 11, 2012

(54) OPTICAL SIGNAL PROCESSING APPARATUS

(75) Inventors: Hiroki Ooi, Kawasaki (JP); Akira Miura, Kawasaki (JP); Tsuyoshi Yamamoto, Kawasaki (JP); Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 12/659,270

(22) Filed: Mar. 2, 2010

(65) Prior Publication Data

US 2010/0221002 A1   Sep. 2, 2010

Related U.S. Application Data

(63) Continuation of application No. PCT/JP2007/067151, filed on Sep. 3, 2007.

(51) Int. Cl.
*H04J 14/00* (2006.01)

(52) U.S. Cl. ........ 398/48; 398/83; 398/79; 398/53; 398/161; 398/81; 398/147; 398/158; 398/159; 385/24; 385/37; 385/16; 385/17; 385/18

(58) Field of Classification Search ........ 398/79, 398/83, 45, 48, 49, 147, 158, 159, 161, 81, 398/84, 85, 87, 50, 53, 52; 385/24, 37, 16, 385/17, 18

See application file for complete search history.

(56) References Cited

U.S. PATENT DOCUMENTS

| | | | |
|---|---|---|---|
| 7,440,650 B2 * | 10/2008 | Fondeur et al. ............ | 385/18 |
| 2004/0151432 A1 * | 8/2004 | Tabuchi et al. ............ | 385/37 |
| 2007/0077003 A1 | 4/2007 | Aota et al. | |
| 2007/0189775 A1 * | 8/2007 | Charlet et al. ............ | 398/147 |

FOREIGN PATENT DOCUMENTS

JP   2007-101670   4/2007

OTHER PUBLICATIONS

Mathieu Lefrancois et al., "Cross comparison of the nonlinear impairments caused by 10Gbit/s neighboring channels on a 40Gbit/s channel modulated with various formats, and over various fiber types", OFC2007, JThA44, Mar. 2007, 3 pages.
L.N. Binh et al., "Phase-modulated hybrid 40Gb/s and 10Gb/s DPSK DWDM long-haul optical transmission", OFC2007, JWA94, Mar. 2007, 11 pages.
C. Fürst et al., "Analysis of Crosstalk in Mixed 43 Gb/s RZ-DQPSK and 10.7 Gbls DWDM Systems at 50 GHz Channel Spacing", OFC2007, OThs2, Mar. 2007, 3 pages.
G. Charlet et al., "Nonlinear Interactions Between 10Gb/s NRZ Channels and 40Gb/s Channels with RZ-DQPSK or PSBT Format, over Low-Dispersion Fiber", ECOC 2006 Mo. 3.2.6., 2 pages.
International Search Report for PCT/JP2007/067151, mailed Dec. 4, 2007.

* cited by examiner

*Primary Examiner* — Hanh Phan
(74) *Attorney, Agent, or Firm* — Staas & Halsey LLP

(57) ABSTRACT

An OADM in a wavelength division multiplexing transmission system includes a wavelength selection switch that selects a predetermined wavelength from a multiple optical signal obtained by multiplexing a phase modulated signal and an intensity modulated signal and outputs the selected wavelength signal to a predetermined output port. The wavelength selection switch has a different delay for each wavelength of the multiple optical signal. For example, the wavelength selection switch includes a mirror array. Optical paths from the surfaces of mirrors arranged on the mirror array to the diffraction grating are different in the case of adjacent mirrors.

13 Claims, 13 Drawing Sheets

NZ-DSF 50 km × 12 span

Delay between neighboring channels per span (ps)

OPTICAL SIGNAL PROCESSING APPARATUS

CROSS-REFERENCE TO RELATED APPLICATION(S)

This application is a continuation of International Application No. PCT/JP2007/067151, filed on Sep. 3, 2007, the entire contents of which are incorporated herein by reference.

FIELD

The embodiments discussed herein are directed to an optical signal processing apparatus that inserts an optical signal into a multiple optical signal and splits an optical signal from the multiple optical signal.

BACKGROUND

In recent years, the request for the introduction of a next-generation 40 Gbit/s optical transmission system has increased. Furthermore, it has been requested that the 40 Gbit/s optical transmission system should have the same transmission range and frequency use efficiency as those of a 10 Gbit/s system. To realize this, research and development for RZ-DPSK (Differential Phase-Shift Keying) modulation or CSRZ-DPSK modulation become active. The RZ-DPSK or CSRZ-DPSK modulation is a modulation method that is excellent in an optical signal to noise ratio (OSNR) bearing force and a nonlinear bearing force as compared to an NRZ (Non Return to Zero) modulation method that has been applied to a conventional 10 Gbit/s or less system. In addition to the modulation methods, research and development for a phase modulation method also become active. The phase modulation method includes RZ-DQPSK (Differential Quadrature Phase-Shift Keying) modulation or (CS) RZ-DQPSK modulation that has the special feature of a narrow spectrum (high frequency use efficiency) (for example, see G. Charlet et al., "Non-liner Interactions between 10 Gb/s NRZ Channels and 40 Gb/s Channels with RZ-DQPSK or PSBT Format over Low-Dispersion Fiber", ECOC 2006 Mo.3.2.6.).

FIG. 11 is a diagram illustrating a configuration example of a light transmitting device 10 and a light receiving device 30 that employ a 43 Gbit/s RZ-DPSK or CSRZ-DPSK modulation method. FIG. 12 is a diagram illustrating the states of a light intensity and an optical phase when transmitting and receiving an optical signal modulated in a RZ-DPSK or CSRZ-DPSK modulation method.

In FIG. 11, the light transmitting device 10 transmits an optical signal modulated in a 43 Gbit/s RZ-DPSK or CSRZ-DPSK modulation method. For example, the light transmitting device 10 includes a transmitted data processing unit 11, a CW (Continuous Wave) light source 12, a phase modulator 13, and an RZ-pulsed intensity modulator 14.

Specifically, the transmitted data processing unit 11 has a function that acts as a framer that frames data to be input, a function that acts as an FEC (Forward Error Correction) encoder that provides an error correction code, and a function that acts as a DPSK precoder that performs an encoding process in which difference information between a code before one bit and a current code is reflected.

The phase modulator 13 modulates the phase of continuous light output from the CW light source 12 in accordance with encoded data output from the transmitted data processing unit 11, and outputs an optical signal of which the light intensity is constant and the binary optical phase carries on information, that is to say, an optical signal that is modulated in a DPSK method (see the lower stage of FIG. 12).

The intensity modulator 14 RZ-pulses the optical signal output from the phase modulator 13 (see the upper stage of FIG. 12). Particularly, an RZ-DPSK signal indicates an optical signal RZ-pulsed by using a clock driving signal that has the same frequency (43 GHz) as the bit rate of data and an amplitude obtained by multiplying an extinction voltage (Vπ) by one. Moreover, a CSRZ-DPSK signal indicates an optical signal RZ-pulsed by using a clock driving signal that has a frequency (21.5 GHz) obtained by multiplying the bit rate of data by ½ and an amplitude obtained by multiplying an extinction voltage (Vπ) by two.

The light receiving device 30 is connected to the light transmitting device 10 via a transmission path 20 and an optical repeater 21, and performs received signal processing on a (CS) RZ-DPSK signal output from the light transmitting device 10 in an optical repeating transmission method. For example, the light receiving device 30 includes a delay interferometer 31, a photo-electric converting unit 32, a reproducing circuit 33, and a received data processing unit 34.

Specifically, the delay interferometer 31 is, for example, a Mach-Zehnder interferometer. The delay interferometer 31 causes a delay component of a one-bit time (23.3 ps in the configuration example of FIG. 11) to interfere (delay-interfere) in a component on which a zero-radian phase control is performed, with respect to the (CS) RZ-DPSK signal transmitted through the transmission path 20, and outputs the interference result as two outputs. In the Mach-Zehnder interferometer, a split wave guide is formed to be longer than another split wave guide by a propagation length corresponding to a one-bit time and an electrode is formed to control the phase of an optical signal propagating the other split wave guide.

The photo-electric converting unit 32 is a dual pin photo-diode that performs differential photoelectric conversion detection (balanced detection) by respectively receiving outputs from the delay interferometer 31. In addition, a received signal detected by the photo-electric converting unit 32 is appropriately amplified by an amplifier.

The reproducing circuit 33 extracts a data signal and a clock signal from the received signal detected by the photo-electric converting unit 32 in a differential photoelectric conversion method. The received data processing unit 34 performs signal processing such as error correction based on the data signal and clock signal extracted by the reproducing circuit 33.

FIG. 13 is a diagram illustrating a configuration example of a light transmitting device 40 and a light receiving device 60 that employ a 43 Gbit/s RZ-DQPSK or CSRZ-DQPSK modulation method. FIG. 14 is a diagram illustrating the states of a light intensity and an optical phase when an RZ-DQPSK or CSRZ-DQPSK modulated optical signal is transmitted and received.

For example, in FIG. 13, the light transmitting device 40 includes a transmitted data processing unit 41, a 1:2 separating unit (DMUX) 42, a CW light source 43, a π/2 phase shifter 44, two phase modulators 45A and 45B, and an RZ-pulsed intensity modulator 46.

Specifically, the transmitted data processing unit 41 includes functions as a framer and an FEC encoder and a function as a DQPSK precoder that performs an encoding process in which difference, information between a code before one bit and a current code is reflected, similarly to the transmitted data processing unit 11 illustrated in FIG. 11.

The 1:2 separating unit 42 divides 43 Gbit/s encoded data output from the transmitted data processing unit 41 into 21.5

Gbit/s two-series encoded data #1 and #2. The CW light source 43 outputs continuous light. The outputted continuous light is divided into two light beams. One light beam is input into the phase modulator 45A and the other light beam is input into the phase modulator 45B via the π/2 phase shifter 44.

The phase modulator 45A modulates the continuous light output from the CW light source 43 by using one-series encoded data #1 divided by the 1:2 separating unit 42 and outputs an optical signal in which information is carried on a binary optical phase (0 radian or π radians). Moreover, the phase modulator 45B receives light that is obtained by phase-shifting the continuous light output from the CW light source 43 by π/2 in the π/2 phase shifter 44, modulates the received light by using the other-series encoded data #2 separated by the 1:2 separating unit 42, and outputs an optical signal in which information is carried on a binary optical phase (π/2 radians or 3π/2 radians).

The light modulated by the phase modulators 45A and 45B is multiplexed and then is output to the subsequent-stage RZ-pulsed intensity modulator 46. In other words, modulated light output from the phase modulators 45A and 45B is multiplexed, and thus an optical signal (see the lower stage of FIG. 14) of which the light intensity is constant and information is carried on a four-value optical phase, that is to say, a DQPSK-modulated optical signal is sent to the RZ-pulsed intensity modulator 46.

The intensity modulator 46 RZ-pulses the DQPSK-modulated optical signal output from the phase modulators 45A and 45B similarly to the intensity modulator 14 illustrated in FIG. 11. Particularly, an RZ-DQPSK signal indicates an optical signal RZ-pulsed by using a clock driving signal that has the same frequency (21.5 GHz) as the bit rate of data #1 and #2 and an amplitude obtained by multiplying an extinction voltage (Vπ) by one. Moreover, a CSRZ-DQPSK signal indicates an optical signal RZ-pulsed by using a clock driving signal that has a frequency (10.75 GHz) obtained by multiplying the bit rate of data #1 and #2 by ½ and an amplitude obtained by multiplying an extinction voltage (Vπ) by two.

The light receiving device 60 is connected to the light transmitting device 40 via a transmission path 50 and an optical repeater 51, and performs received signal processing on the (CS) RZ-DQPSK signal output from the light transmitting device 40 in an optical repeating transmission method. For example, the light receiving device 60 includes a splitting unit 61 that splits the received optical signal into two. The light receiving device 60 further includes delay interferometers 62A and 62B, photo-electric converting units 63A and 63B, and reproducing circuits 64A and 64B on optical signal paths on which the split optical signals are propagated. Furthermore, the light receiving device 60 includes a 2:1 multiplexing unit (MUX) 65 that multiplexes the data signal reproduced by the reproducing circuits 64A and 64B and a received data processing unit 66.

Specifically, the delay interferometers 62A and 62B respectively receive the optical signals that are obtained by splitting the (CS) RZ-DQPSK signal transmitted through the transmission path 50 and the optical repeater 51 into two by using the splitting unit 61. The delay interferometer 62A causes the delay component of a one-bit time (46.5 ps in the configuration example of FIG. 13) to interfere (delay interfere) in a component on which the phase control of π/4 radians is performed, and outputs the interference result as two outputs.

Moreover, the delay interferometer 62B causes the delay component of the one-bit time to interfere (delay interfere) in a component (the phase deviates by π/2 radians from the same component of the delay interferometer 62A) on which the phase control of −π/4 radians is performed, and outputs the interference result as two outputs. In this case, each of the delay interferometers 62A and 62B is configured of a Mach-Zehnder interferometer, and is configured of a dual pin photodiode that performs differential photoelectric conversion detection by receiving light. In addition, the received signals detected by the photo-electric converting units 63A and 63B are appropriately amplified by an amplifier.

The reproducing circuit 64A reproduces an in-phase component I for the clock signal and data signal from the received signal detected by the photo-electric converting unit 63A in a differential photoelectric conversion method. Moreover, the reproducing circuit 64B reproduces a quadrature-phase component Q for the clock signal and data signal from the received signal detected by the photo-electric converting unit 63B in a differential photoelectric conversion method.

The 2:1 multiplexing unit 65 receives the in-phase component I and the quadrature-phase component Q that are respectively output from the reproducing circuits 64A and 64B, and converts them into a 43 Gbit/s data signal before DQPSK modulation. The received data processing unit 66 performs signal processing such as error correction based on the data signal output from the 2:1 multiplexing unit 65.

As described above, a market demands the realization of a wavelength division multiplexing transmission system that operates based on a multiple signal obtained by mixing a 40 Gbit/s phase modulated signal (a signal modulated by (CS) RZ-DQPSK modulation method or (CS) RZ-DPSK modulation method) and a conventional 10(2.5) Gbit/s intensity modulated signal (a signal modulated by an NRZ method).

However, when the wavelength division multiplexing transmission system is configured, the 40 Gbit/s phase modulated signal receives an optical phase shift caused by cross phase modulation (XPM) from the 10(2.5) Gbit/s intensity modulated signal. Therefore, there is a problem in that a waveform is conspicuously degraded and long distance transmission becomes difficult.

In other words, it extremely becomes an important problem to prevent the waveform degradation (XPM degradation) of a phase modulated signal even if the phase modulated signal and the intensity modulated signal are wavelength-multiplexed.

SUMMARY

According to an aspect of an embodiment of the invention, an optical signal processing apparatus inserts and splits an optical signal into and from an acquired multiple optical signal that is obtained by wavelength-multiplexing an optical signal modulated by a first modulation method and an optical signal modulated by a second modulation method. The optical signal processing apparatus includes a wavelength selection switch that selects a predetermined wavelength from the multiple optical signal and outputs an optical signal having the selected wavelength to a predetermined output port. The wavelength selection switch has a different delay for each wavelength of the selected optical signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

A preferred embodiment of the present invention will be explained with reference to accompanying drawings. The invention is not limited to the embodiments. The present invention is not limited to the embodiments explained below.

[a] First Embodiment

Figure 15:
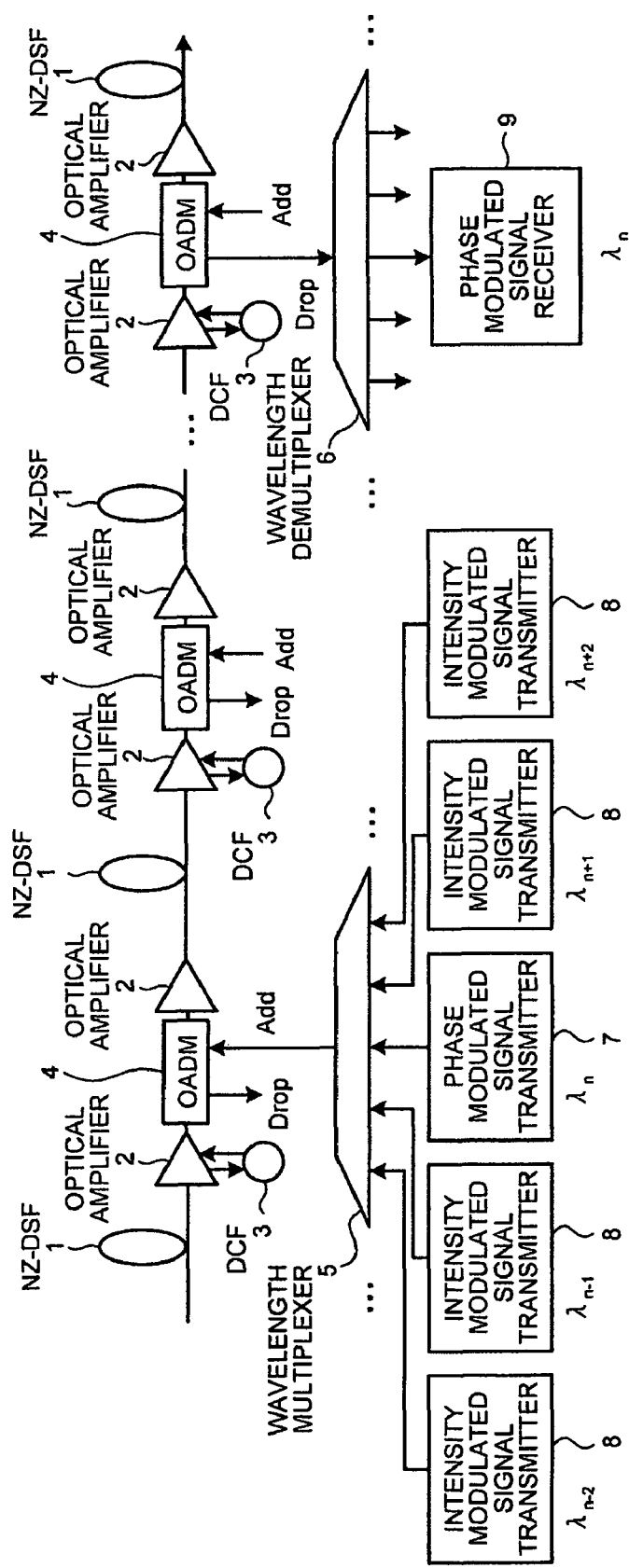
FIG. 15 is a diagram illustrating a conventional wavelength division multiplexing transmission system that operates based on a multiple signal obtained by mixing a phase modulated signal and an intensity modulated signal.

Before explaining the embodiment of the present invention, it will be explained about a conventional wavelength division multiplexing transmission system that operates based on a multiple signal obtained by mixing a phase modulated signal (a signal modulated by a (CS) RZ-DPSK modulation method or a (CS) RZ-DQPSK modulation method) and an intensity modulated signal (a signal modulated by an NRZ modulation method). FIG. 15 is a diagram illustrating a conventional wavelength division multiplexing transmission system that operates based on a multiple signal obtained by mixing a phase modulated signal and an intensity modulated signal.

As illustrated in the present drawing, the wavelength division multiplexing transmission system includes an NZ-DSF (Non-Zero Dispersion Shifted Fiber) 1, an optical amplifier 2, a DCF (Dispersion Compensating Fiber) 3, an OADM (Optical Add-Drop Multiplexer) 4, a wavelength multiplexer 5, a wavelength demultiplexer 6, a phase modulated signal transmitter 7, an intensity modulated signal transmitter 8, and a phase modulated signal receiver 9.

Among them, the NZ-DSF (non-zero-dispersion shift single mode fiber) 1 is an optical fiber that slightly shifts a zero-dispersion wavelength from a 1550 nm band to suppress a nonlinear phenomenon at the 1550 nm band.

The optical amplifier 2 amplifies an optical signal. The DCF 3 is a dispersion compensator (dispersion compensation fiber as a representative example) that compensates for the chromatic dispersion of optical signals that are transmitted on a transmission path NZ-DSF1. The OADM 4 is an add-drop multiplexer that inserts or splits an optical signal assigned for each wavelength.

Figure 16:
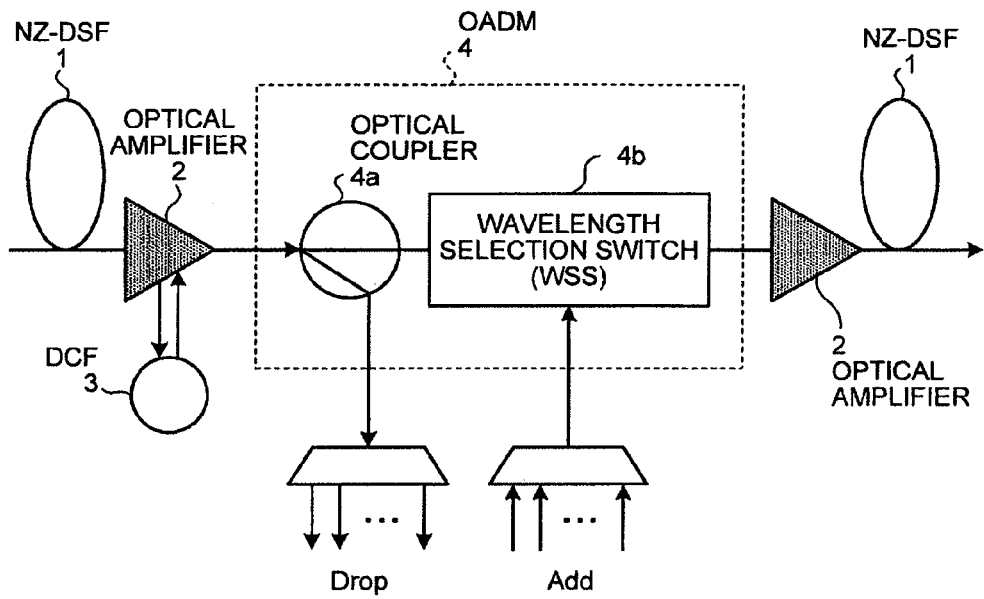
FIG. 16 is a functional block diagram illustrating the configuration of OADM.

FIG. 16 is a functional block diagram illustrating the configuration of the OADM 4. As illustrated in the present drawing, the OADM 4 includes an optical coupler 4a and a wavelength selection switch (WSS) 4b. The optical coupler 4a is a device that splits an optical signal input into the OADM 4 into two or more outputs.

Figure 17:
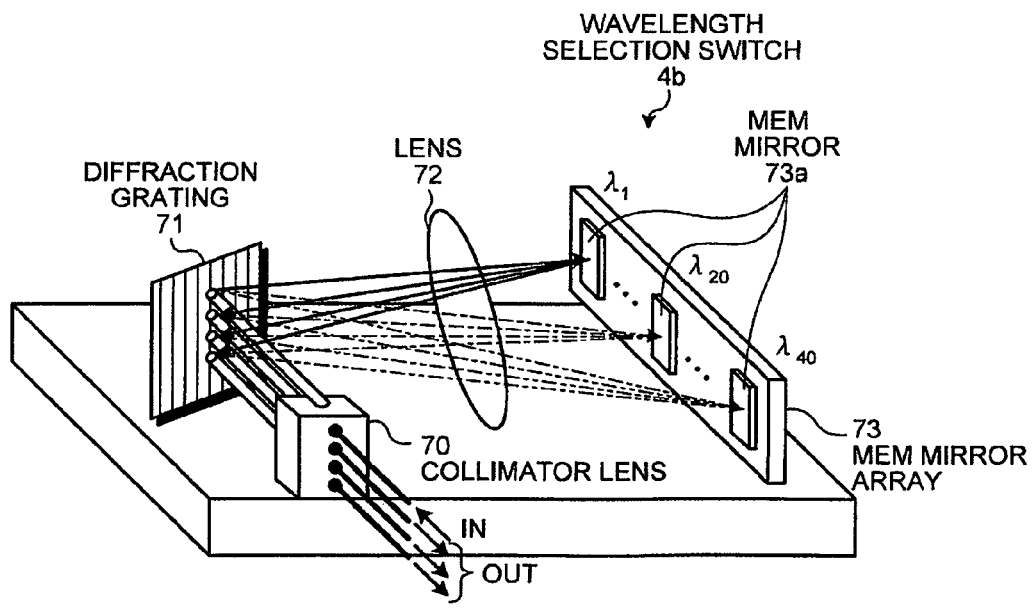
FIG. 17 is a diagram illustrating the configuration of a conventional wavelength selection switch.

The wavelength selection switch 4b is a switch that selects an arbitrary wavelength from the optical signal (wavelength-multiplexed optical signal) input into the OADM 4 and outputs an optical signal having the selected wavelength to an arbitrary optical output port. FIG. 17 is a diagram illustrating the configuration of the conventional wavelength selection switch 4b. As illustrated in the present drawing, the wavelength selection switch 4b includes a collimator lens 70, a diffraction grating 71, a lens 72, and an MEM mirror array 73. The MEM mirror array 73 includes MEM mirrors 73a that respectively correspond to channels.

As the principle of the wavelength selection switch 4b, the diffraction grating 71 spatially separates an optical signal input via the collimator lens (lens for forming parallel light) 70 and the rotation angles of the MEM mirrors 73a corresponding to channels ($\lambda_1$, $\lambda_2$, and the like) are controlled, in order to switch optical output ports. In addition, the lens 72 respectively matches the focal points of the optical signals output from the diffraction grating 71 with the MEM mirrors 73a.

Figure 18:
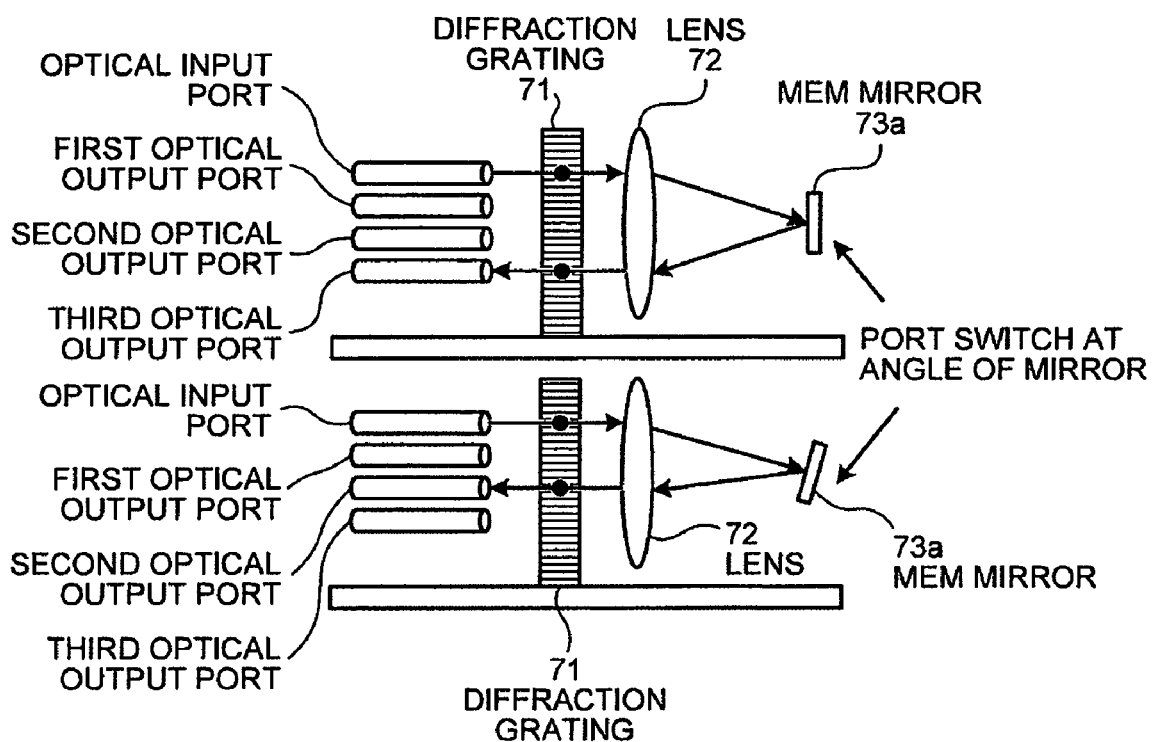
FIG. 18 is a diagram explaining the switching of an optical output port performed by a MEM mirror.

FIG. 18 is a diagram explaining the switching of the optical output ports performed by the MEM mirrors 73a. As illustrated in the present drawing, for example, a third optical output port can be switched to a second optical output port by adjusting the angles of the MEM mirrors 73a.

Referring to FIG. 15 again, the wavelength multiplexer 5 multiplexes the phase modulated signal output from the phase modulated signal transmitter 7 and the intensity modulated signal output from the intensity modulated signal transmitter 8 and outputs the multiplexed optical signal to the OADM 4.

The wavelength demultiplexer 6 demultiplexes, when acquiring an optical signal from the OADM 4, the acquired optical signal for each light wavelength and outputs, for example, the phase modulated signal output from the phase modulated signal transmitter 7 to the phase modulated signal receiver 9. Moreover, the wavelength demultiplexer 6 outputs the other optical signal (intensity modulated signal) to each intensity modulated signal receiver (not illustrated).

The phase modulated signal transmitter 7 is a device that transmits, for example, an optical signal modulated by a 40 Gbit/s (CS) RZ-DPSK modulation method or (CS) RZ-DQPSK modulation method (specifically, see FIGS. 11 to 14). The intensity modulated signal transmitter 8 is a device that outputs, for example, an optical signal modulated by a 10 Gbit/s or 2.5 Gbit/s NRZ modulation method.

The phase modulated signal receiver 9 is connected to the phase modulated signal transmitter 7 via the wavelength multiplexer 5, the OADM 4, the optical amplifier 2, NZ-DSF1, the DCF 3, and the wavelength demultiplexer 6. The phase modulated signal receiver 9 performs received signal processing on the phase modulated signal output from the phase modulated signal transmitter 7 in an optical repeating transmission method (specifically, see FIGS. 11 to 14).

Figure 1:
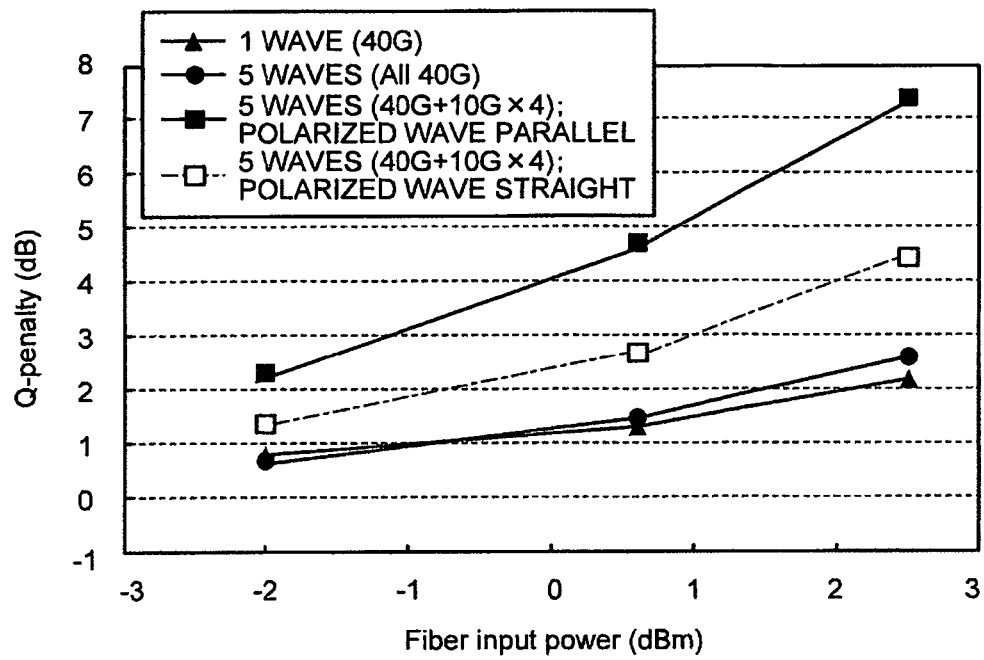
FIG. 1 is a diagram illustrating XPM degradation between a phase modulated signal and an intensity modulated signal.

Next, it will be explained about XPM degradation caused by the wavelength division multiplexing transmission system illustrated in FIG. 15. FIG. 1 is a diagram illustrating XPM degradation between a phase modulated signal and an intensity modulated signal. In FIG. 1, as an example, it is assumed that the transmission speed of the phase modulated signal is 40 Gbit/s and the transmission speed of the intensity modulated signal is 10 Gbit/s. In FIG. 1, measurement results are illustrated when an optical signal is transmitted in the case of the 50 km NZ-DSF with 12 spans. Hereinafter, it is assumed that one span means the movement of optical signal from the output from the NZ-DSF to the input into the next NZ-DSF via the transmission path.

As illustrated in FIG. 1, when the phase modulated signal is one wave or when all the multiplexed optical signals are the phase modulated signal, a Q penalty goes low even if the intensity (for example, the intensity of the optical signal at the time point of the input from the optical amplifier 2 into the transmission path) of the optical signal dominated by an optical fiber becomes high. A Q penalty is an index indicative of transmission signal quality. When the Q penalty is large, the symbol error rate of optical signal becomes large.

On the other hand, when a multiplexed optical signal includes a phase modulated signal and an intensity modulated signal (for example, when a multiplexed optical signal includes one phase modulated signal and four intensity modulated signals), the stronger the intensity of the optical signal input into the optical fiber becomes, the more the Q penalty becomes large. Particularly, when a relationship between the polarized wave of the phase modulated signal and the polarized wave of the intensity modulated signal is parallel, the Q penalty becomes large (the influence of XPM degradation becomes large).

Next, it will be explained about a relationship between an inline dispersion compensation ratio in the NZ-DSF1 and the DCF 3, a delay between adjacent channels per one span (hereinafter, a delay between channels), and a Q penalty. When the inline dispersion compensation ratio becomes 100%, an inline remaining dispersion amount becomes zero. An inline remaining dispersion amount indicates a remaining dispersion amount (average between spans) that occurs on the transmission path and in the DCF 3 per one span.

Figure 2:
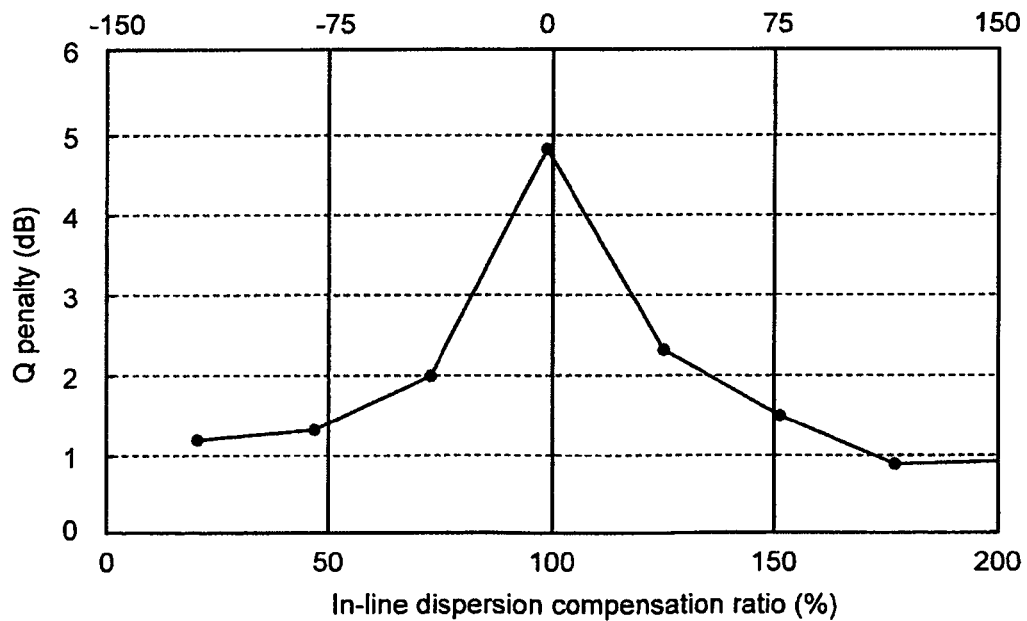
FIG. 2 is a diagram illustrating a relationship between a delay between an inline dispersion compensation ratio and a channel and a Q penalty.

FIG. 2 is a diagram illustrating a relationship between an inline dispersion compensation ratio, a delay between channels, and a Q penalty. As illustrated in the present drawing, in the vicinity of the point at which the inline dispersion compensation ratio becomes 100% or the delay between channels becomes 0 ps, it turns out that the Q penalty conspicuously occurs. This reason is that when the inline dispersion compensation ratio becomes 100%, the degradation of the phase modulated signal is conspicuously accumulated because the phase modulated signal continues to receive the chirp of the same code from the rising or trailing of the bit of the same intensity modulated signal in each relaying span.

Figure 3:
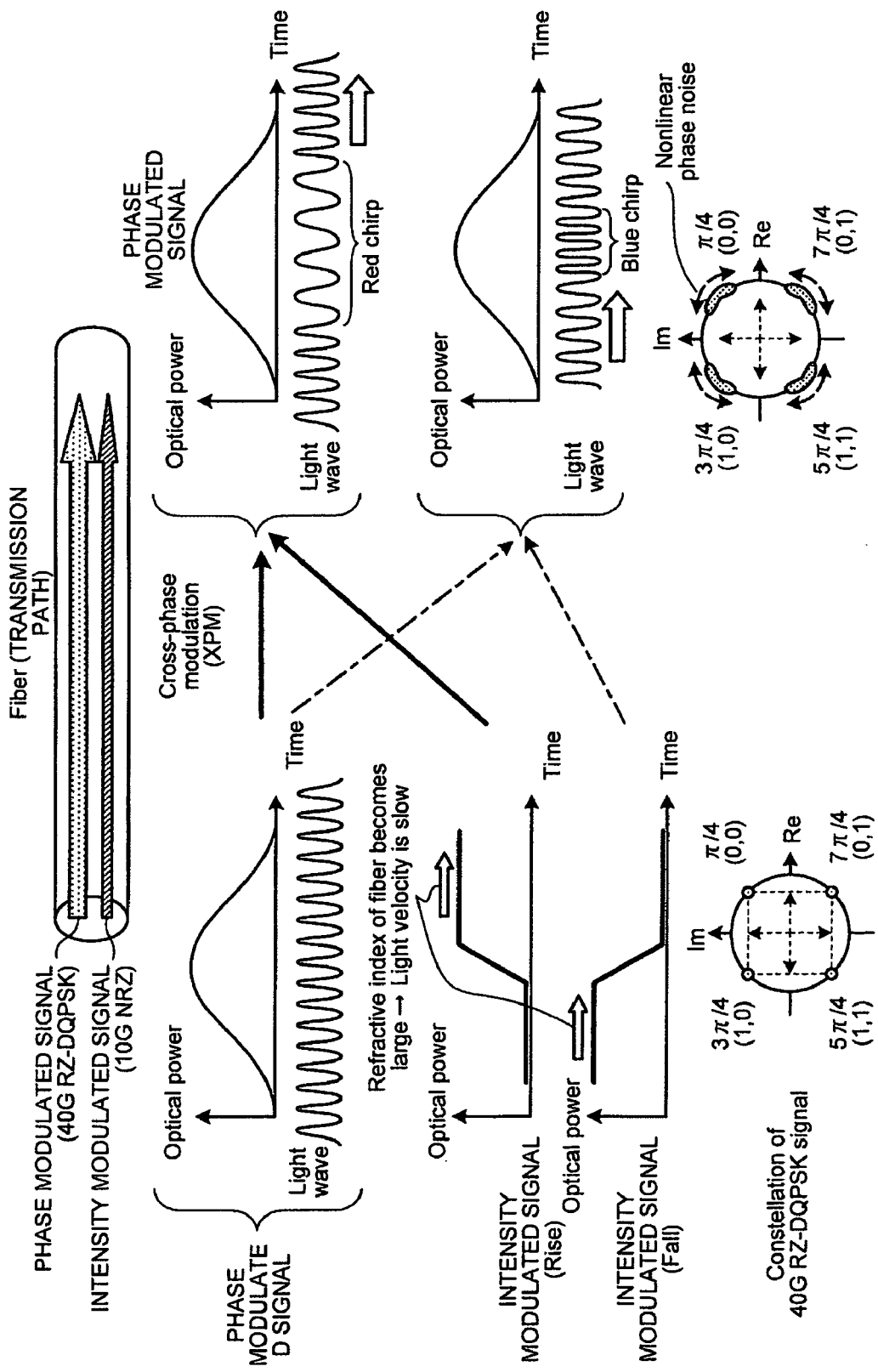
FIG. 3 is a diagram explaining the influence of an intensity modulated signal on a phase modulated signal.

FIG. 3 is a diagram explaining an influence of an intensity modulated signal on a phase modulated signal. The phase modulated signal located at a first stage of the left side of the present drawing indicates an undegraded phase modulated signal before being influenced by an intensity modulated signal. In such a phase modulated signal (see the first stage of the left side of FIG. 3), the instantaneous frequency of the phase modulated signal is shifted (red chirp) to a point at which a frequency is low (see a first stage of the right side of FIG. 3) when being influenced by the rising (see a second stage of the left side of FIG. 3) of the bit of the intensity modulated signal.

On the other hand, in the phase modulated signal (see the first stage of the left side of FIG. 3), the instantaneous frequency of the phase modulated signal is shifted (blue chirp) to a point at which a frequency is high (see a second stage of the right side of FIG. 3) when being influenced by the falling (see a third stage of the left side of FIG. 3) of the bit of the intensity modulated signal. When the inline dispersion compensation ratio becomes about 100%, because the same position of the phase modulated signal continues to be influenced by red chirp or blue chirp, the optimum arrangement (a fourth stage of the left side of FIG. 3) of the phase modulated signal degrades like a fourth stage of the right side of FIG. 3 and thus the Q penalty becomes large.

Next, it will be explained about the brief and special feature of the OADM according to a first embodiment of the present invention. The OADM according to the first embodiment of the present invention has a wavelength selection switch that selects a predetermined wavelength from a multiple optical signal obtained by multiplexing a phase modulated signal and an intensity modulated signal and outputs the selected wavelength signal to a predetermined output port. The wavelength selection switch has a different delay for each wavelength of the multiple optical signal (the differential delay between channels is given from the inside of the wavelength selection switch).

In this manner, in the OADM according to the first embodiment of the present invention, the delays of the phase modulated signal and the intensity modulated signal are not identical to each other because the differential delay between channels is given from the inside of the wavelength selection switch. Because the same position of the phase modulated signal does not continue to be influenced by red chirp or blue chirp (because the influence of red chirp or blue chirp is dispersed), the waveform degradation (XPM degradation) of the phase modulated signal can be prevented even if the phase modulated signal and the intensity modulated signal are wavelength-multiplexed.

Figure 4:
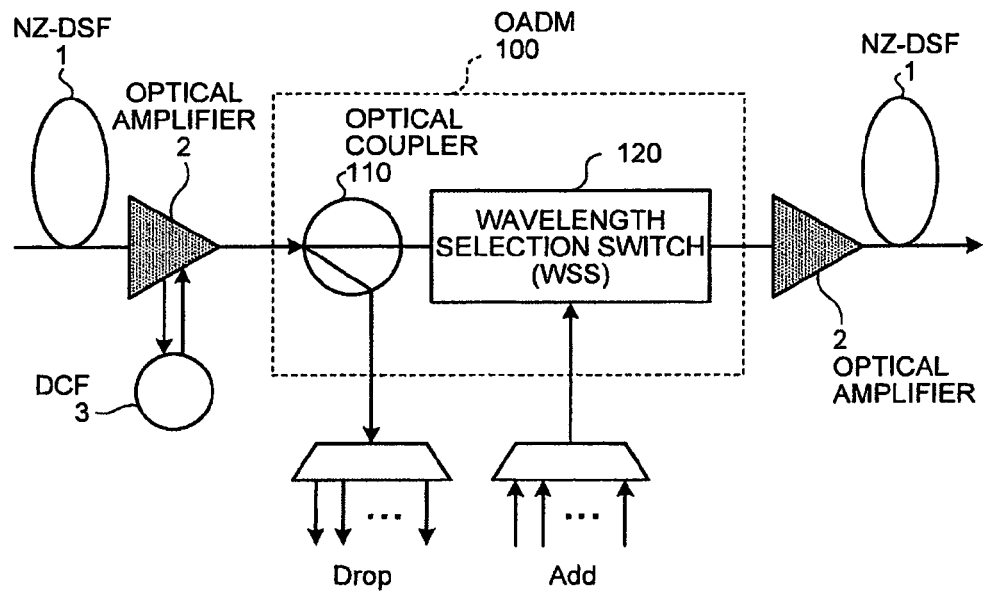
FIG. 4 is a functional block diagram illustrating the configuration of OADM according to a first embodiment of the present invention.

FIG. 4 is a functional block diagram illustrating the configuration of an OADM 100 according to the first embodiment of the present invention. As illustrated in the present drawing, the OADM 100 includes an optical coupler 110 and a wavelength selection switch (WSS) 120. The optical coupler 110 splits an optical signal input into the OADM 100 into two or more outputs. The wavelength selection switch 120 is a switch that selects a predetermined wavelength from the optical signal (wavelength-multiplexed optical signal) input into the OADM 100 and outputs an optical signal having the selected wavelength to a predetermined optical output port.

Figure 5:
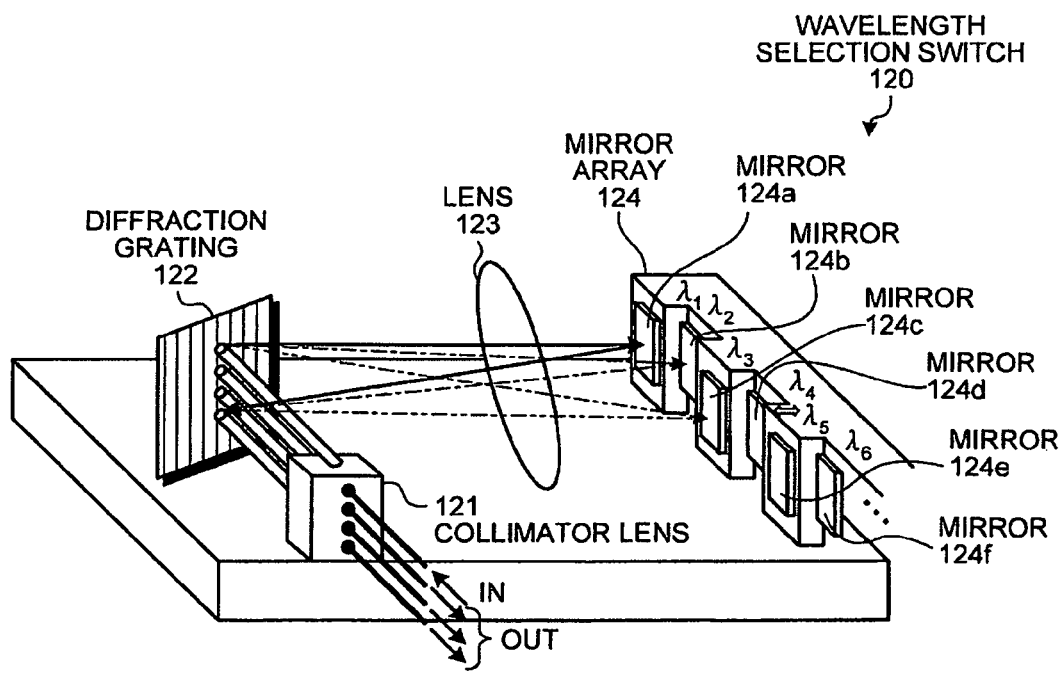
FIG. 5 is a diagram illustrating the configuration of a wavelength selection switch according to the first embodiment of the present invention.

FIG. 5 is a diagram illustrating the configuration of the wavelength selection switch 120 according to the first embodiment of the present invention. As illustrated in the present drawing, the wavelength selection switch 120 includes a collimator lens 121, a diffraction grating 122, a lens 123, and a mirror array 124.

Among them, the collimator lens 121 is a lens for forming parallel light. The diffraction grating 122 separates a multiple optical signal for each wavelength. The lens 123 adjusts the focal point of an optical signal that is output from the diffraction grating 122 to the mirror array 124.

The mirror array (MEMS, liquid crystal, and the like) 124 includes a plurality of mirrors 124a to 124f and is a device that controls the rotation angle of the mirror corresponding to each channel (wavelength $\lambda_n$) to switch output ports. In addition, the plurality of mirrors 124a to 124f is arranged in the shape of saw on the mirror array 124.

In an example illustrated in FIG. 5, the mirror 124a selects the output port of the optical signal having a wavelength $\lambda_1$. The mirror 124b selects the output port of the optical signal having a wavelength $\lambda_2$. The mirror 124c selects the output port of the optical signal having a wavelength $\lambda_3$. The mirror 124d selects the output port of the optical signal having a wavelength $\lambda_4$. The mirror 124e selects the output port of the optical signal having a wavelength $\lambda_5$. The mirror 124f selects the output port of the optical signal having a wavelength $\lambda_6$.

As the principle of the wavelength selection switch 120, the diffraction grating 122 spatially separates the optical signal input via the collimator lens 121 and the rotation angles of the mirrors 124a to 124f corresponding to channels ($\lambda_1$, $\lambda_2$, and the like) are controlled, in order to switch optical output ports.

Particularly, in the wavelength selection switch 120 illustrated in the first embodiment of the present invention, as illustrated in FIG. 5, optical paths from the surfaces of the mirrors to the diffraction grating 122 are different in the case of adjacent mirrors (for example, the mirrors 124a and 124b). In this case, assuming that among the adjacent mirrors, the surface of the mirror array 124 on which one mirror is arranged is a first surface and the surface of the mirror array 124 on which the other mirror is arranged is a second surface, the distance between the first surface and the second surface becomes not less than a predetermined value (for example, not less than 2 cm).

The distance between the first surface and the second surface is different depending on the transmission speed of intensity modulated signal. For example, when the transmission speed of intensity modulated signal is 10 Gbit/s, the distance between the first surface and the second surface is set to 2 cm or more. Moreover, when the transmission speed of intensity modulated signal is 2.5 Gbit/s, the distance between the first surface and the second surface is set to 8 cm or more. Furthermore, when the transmission speed of intensity modulated signal is 40 Gbit/s, the difference between the first surface and the second surface is set to 4 cm or more.

In general, when the transmission speed of intensity modulated signal is M Gbit/s (M is an integer number not less than zero), the distance between the first surface and the second surface is set to become 20/Mcm or more.

In this manner, because optical paths from the mirrors to the diffraction grating 122 are different by providing an optical path difference to the first surface and the second surface (arranging the mirrors 124a to 124f in the shape of saw), delays between adjacent bits in a multiple optical signal are not identical to each other and thus the waveform degradation of phase modulated signal can be prevented.

Figure 6:
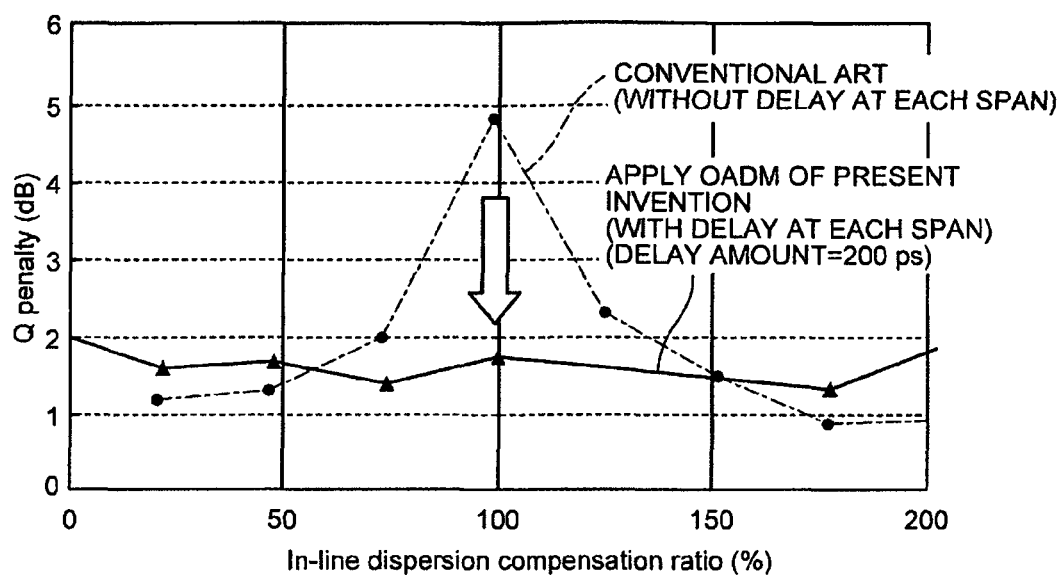
FIG. 6 is a diagram illustrating an effect when the OADM according to the first embodiment of the present invention is applied to a wavelength division multiplexing transmission system.

FIG. 6 is a diagram illustrating an effect when the OADM 100 according to the first embodiment of the present invention is applied to the wavelength division multiplexing transmission system. As illustrated in the present drawing, compared to a conventional wavelength transmission system, by applying the OADM 100 according to the first embodiment of the present invention to the wavelength division multiplexing transmission system, a Q penalty can be suppressed low even if an inline dispersion compensation ratio is 100%.

As described above, the OADM 100 according to the first embodiment of the present invention has the wavelength selection switch 120 that selects a predetermined wavelength from a multiple optical signal obtained by multiplexing a phase modulated signal and an intensity modulated signal and outputs the selected wavelength signal to a predetermined output port and the wavelength selection switch 120 has a different delay for each wavelength of the multiple optical signal. Therefore, because the delays of the phase modulated signal and the intensity modulated signal are not identical to each other and the same position of the phase modulated signal does not continue to be influenced by red chirp or blue chirp (the influence of red chirp or blue chirp is dispersed), the waveform degradation (XPM degradation) of the phase modulated signal can be prevented even if the phase modulated signal and the intensity modulated signal are wavelength-multiplexed.

Even in the case of an existing relay node configuration or an existing transmission path dispersion map, a system that can reduce XPM degradation can be constructed simply and inexpensively in that XPM degradation can be solved by only the configuration change of the wavelength selection switch according to the first embodiment of the present invention.

In addition, in the wavelength selection switch 120 illustrated in FIG. 5, beam diameters on the mirrors are different due to the focal-length relationship of the optical signal between adjacent channels (between even channel and odd channel) and thus the difference of coupling efficiency (optical loss) at module output ports can occur. However, because the wavelength selection switch 120 includes a compensating unit (not illustrated) that gives optical attenuation every wavelength, the wavelength selection switch 120 can compensate for an optical loss difference.

[b] Second Embodiment

Figure 7:
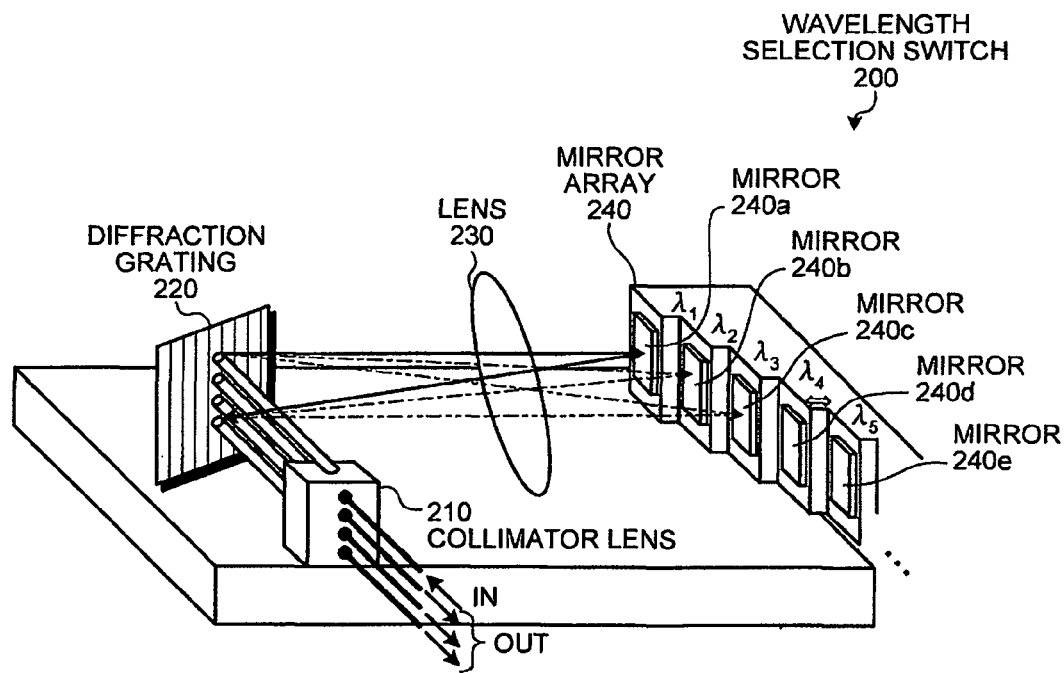
FIG. 7 is a diagram illustrating the configuration of a wavelength selection switch according to a second embodiment of the present invention.

Next, it will be explained about an OADM according to a second embodiment of the present invention. The OADM according to the second embodiment of the present invention includes a wavelength selection switch having the configuration different from that of the OADM 100 illustrated in the first embodiment. FIG. 7 is a diagram illustrating the configuration of a wavelength selection switch 200 according to the second embodiment of the present invention. As illustrated in the present drawing, the wavelength selection switch 200 includes a collimator lens 210, a diffraction grating 220, a lens 230, and a mirror array 240.

Among them, because the collimator lens 210, the diffraction grating 220, and the lens 230 are similar to the collimator lens 121, the diffraction grating 122, and the lens 123 illustrated in FIG. 5, their descriptions are omitted.

The mirror array (MEMS, liquid crystal, and the like) 240 includes a plurality of mirrors 240a to 240e. The mirror array 240 is a device that controls the rotation angles of the mirrors corresponding to channels (wavelength $\lambda_n$) to switch output ports. Moreover, the plurality of mirrors 240a to 240e is arranged in the shape of stairway on the mirror array 240.

In an example illustrated in FIG. 7, the mirror 240a selects the output port of the optical signal having a wavelength $\lambda_1$. The mirror 240b selects the output port of the optical signal having a wavelength $\lambda_2$. The mirror 240c selects the output port of the optical signal having a wavelength $\lambda_3$. The mirror 240d selects the output port of the optical signal having a wavelength $\lambda_4$. The mirror 240e selects the output port of the optical signal having a wavelength $\lambda_5$.

As the principle of the wavelength selection switch 200, the diffraction grating 220 spatially separates the optical signal input via the collimator lens 210 and the rotation angles of the mirrors 240a to 240e corresponding to channels ($\lambda_1, \lambda_2, \ldots$) are controlled, in order to switch optical output ports.

Particularly, in the wavelength selection switch 200 illustrated in the second embodiment of the present invention, as illustrated in FIG. 7, optical paths from the surfaces of the mirrors to the diffraction grating 220 are different in the case of adjacent mirrors (for example, the mirrors 240a and 240b). In this case, assuming that among the adjacent mirrors, the surface of the mirror array 240 on which one mirror is arranged is a first surface and the surface of the mirror array 240 on which the other mirror is arranged is a second surface, the distance between the first surface and the second surface becomes not less than a predetermined value (for example, not less than 2 cm).

In addition, the distance between the first surface and the second surface is different depending on the transmission speed of intensity modulated signal. For example, when the transmission speed of intensity modulated signal is 10 Gbit/s, the distance between the first surface and the second surface is set to 2 cm or more. Moreover, when the transmission speed of intensity modulated signal is 2.5 Gbit/s, the distance between the first surface and the second surface is set to 8 cm or more. Furthermore, when the transmission speed of intensity modulated signal is 40 Gbit/s, the distance between the first surface and the second surface is set to 0.5 cm or more.

In general, when the transmission speed of intensity modulated signal is M Gbit/s (M is an integer number not less than zero), the distance between the first surface and the second surface is set to become 20/M cm or more.

In an example illustrated in FIG. 7, the mirrors 240a to 240e are arranged on the mirror array 240 in such a manner that optical paths between the mirrors 240a to 240e and the diffraction grating 220 become large in the sequence of the mirrors 240a, 240b, and the like. However, the present invention is not limited to this. For example, in FIG. 7, an optical path difference can be provided to adjacent optical signals by sequentially shifting the mirrors from the mirror 240a to a predetermined mirror to the right. An optical path difference can be provided to adjacent optical signals by sequentially shifting the mirrors from a predetermined mirror to the mirror 240e to the left.

By applying the OADM including the wavelength selection switch 200 according to the second embodiment of the present invention to the wavelength division multiplexing transmission system, a Q penalty can be suppressed low even if an inline dispersion compensation ratio is 100% (see FIG. 6).

As described above, the OADM according to the second embodiment of the present invention has the wavelength selection switch 200 that selects a predetermined wavelength from a multiple optical signal obtained by multiplexing a phase modulated signal and an intensity modulated signal and outputs the selected wavelength signal to a predetermined output port and the wavelength selection switch 200 has a different delay for each wavelength of the multiple optical signal. Therefore, because the delays of the phase modulated signal and the intensity modulated signal are not identical to each other and the same position of the phase modulated signal does not continue to be influenced by red chirp or blue chirp (the influence of red chirp or blue chirp is dispersed), the waveform degradation (XPM degradation) of the phase modulated signal can be prevented even if the phase modulated signal and the intensity modulated signal are wavelength-multiplexed.

[c] Third Embodiment

Figure 8:
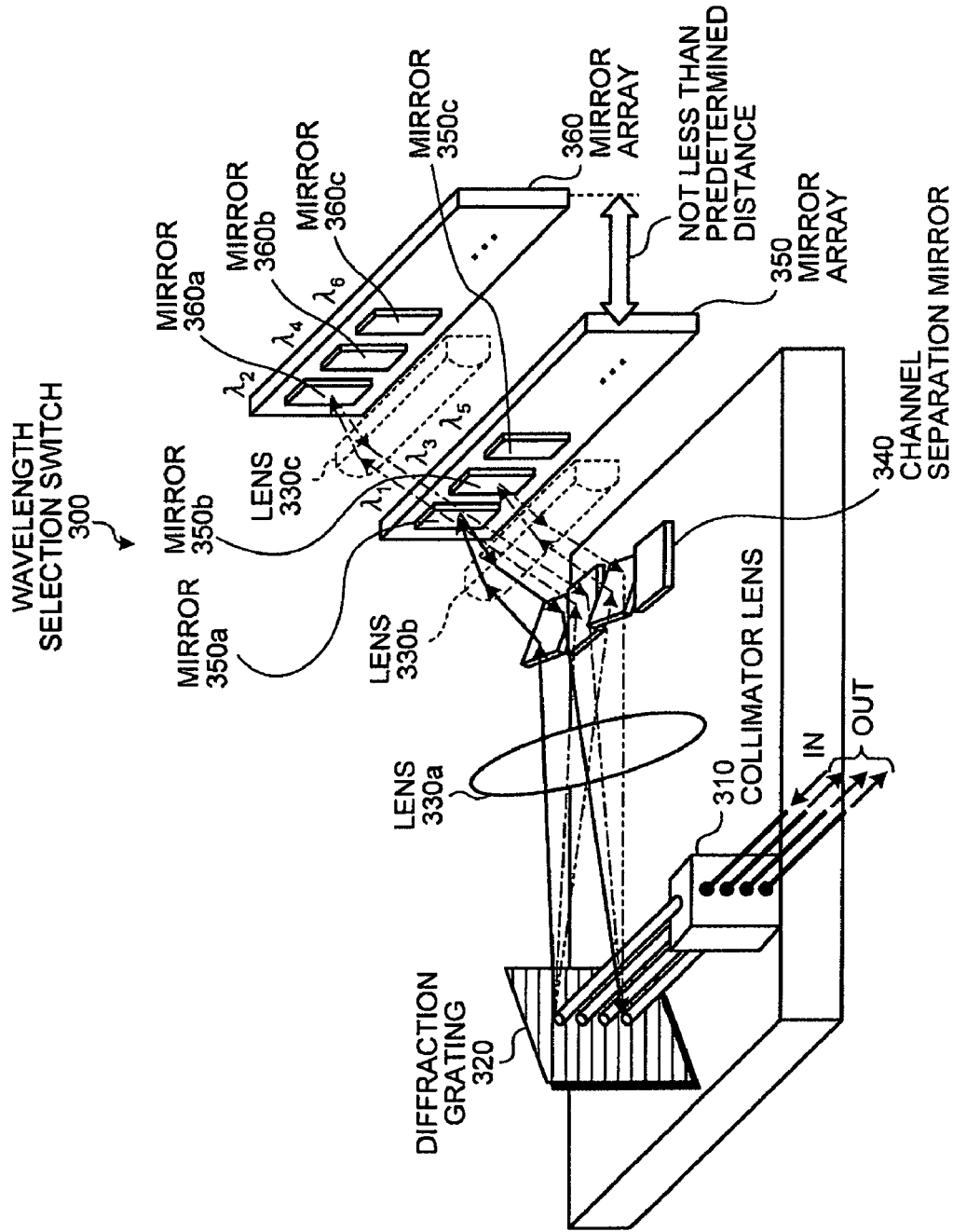
FIG. 8 is a diagram illustrating the configuration of a wavelength selection switch according to a third embodiment of the present invention.

Next, it will be explained about an OADM according to a third embodiment of the present invention. The OADM according to the third embodiment of the present invention includes a wavelength selection switch having the configuration different from that of the OADM illustrated in the first and second embodiments. FIG. 8 is a diagram illustrating the configuration of a wavelength selection switch 300 according to the third embodiment of the present invention. As illustrated in the present drawing, the wavelength selection switch 300 includes a collimator lens 310, a diffraction grating 320, lenses 330a to 330c, a channel separation mirror 340, and mirror arrays 350 and 360.

Among them, because the collimator lens 310, the diffraction grating 320, and the lens 330a are similar to the collimator lens 121, the diffraction grating 122, and the lens 123 illustrated in FIG. 5, their descriptions are omitted.

The lens 330b adjusts the focal point of the optical signal that is reflected from the channel separation mirror 340 to the mirror array 350. The lens 330c adjusts the focal point of the optical signal that is reflected from the channel separation mirror 340 to the mirror array 360.

The channel separation mirror 340 receives an optical signal of each wavelength divided by the diffraction grating 320. Among the received optical signals, the channel separation mirror 340 outputs the optical signals having wavelengths corresponding to odd channels ($\lambda_1, \lambda_3, \lambda_5$, and the like) to the mirror array 350 and outputs the optical signals having wavelengths corresponding to an even channels ($\lambda_2, \lambda_4, \lambda_6$, and the like) to the mirror array 360.

The mirror array 350 includes a plurality of mirrors 350a to 350c corresponding to odd channels. The mirror array 350 is a device that controls the rotation angles of the mirrors corresponding to the odd channels to switch output ports.

In an example illustrated in FIG. 8, the mirror 350a selects the output port of the optical signal having a wavelength $\lambda_1$. The mirror 350b selects the output port of the optical signal having a wavelength $\lambda_3$. The mirror 350c selects the output port of the optical signal having a wavelength $\lambda_5$.

The mirror array 360 includes a plurality of mirrors 360a to 360c corresponding to even channels. The mirror array 360 is a device that controls the rotation angles of the mirrors corresponding to the even channels to switch output ports.

In an example illustrated in FIG. 8, the mirror 360a selects the output port of the optical signal having a wavelength $\lambda_2$. The mirror 360b selects the output port of the optical signal having a wavelength $\lambda_4$. The mirror 360c selects the output port of the optical signal having a wavelength $\lambda_6$.

As the principle of the wavelength selection switch 300, the diffraction grating 320 spatially separates the optical signal input via the collimator lens 310, the mirror array 350 controls the rotation angles of the mirrors 350a to 350c corresponding to odd channels, and the mirror array 360 controls the rotation angles of the mirrors 360a to 360c corresponding to even channels, in order to switch optical output ports.

Particularly, in the wavelength selection switch 300 illustrated in the third embodiment of the present invention, as illustrated in FIG. 8, optical paths from the mirror array 350 (the mirrors 350a to 350c) to the diffraction grating 320 and optical paths from the mirror array 360 (the mirrors 360a to 360c) to the diffraction grating 320 are different. Specifically, the distance between the mirror array 350 (the surfaces of the mirrors 350a to 350c) and the mirror array 360 (the surfaces of the mirrors 360a to 360c) becomes not less than a predetermined value (for example, 2 cm or more).

In addition, the difference between the mirror array 350 and the mirror array 360 is different depending on the transmission speed of intensity modulated signal. For example, when the transmission speed of intensity modulated signal is 10 Gbit/s, the distance between a first surface (the surface of the mirror array 350) and a second surface (the surface of the mirror array 360) is set to 2 cm or more. Moreover, when the transmission speed of intensity modulated signal is 2.5 Gbit/s, the distance between the first surface and the second surface is set to 8 cm or more. Furthermore, when the transmission speed of intensity modulated signal is 40 Gbit/s, the distance between the first surface and the second surface is set to 0.5 cm or more.

In general, when the transmission speed of intensity modulated signal is M Gbit/s (M is an integer number not less than zero), the distance between the mirror array 350 and the mirror array 360 is set to become 20/M cm or more.

As illustrated in FIG. 8, because the optical paths from the mirror array 350 to the diffraction grating 320 and the optical paths from the mirror array 360 to the diffraction grating 320 are different by arranging the mirror array 350 and the mirror array 360, delays between adjacent bits in a multiple optical signal are not identical to each other and thus the waveform degradation of phase modulated signal can be prevented.

By applying the OADM including the wavelength selection switch 300 according to the third embodiment of the present invention to the wavelength division multiplexing transmission system, a Q penalty can be suppressed low even if an inline dispersion compensation ratio is 100% (see FIG. 6).

As described above, the OADM according to the third embodiment of the present invention has the wavelength selection switch 300 that selects a predetermined wavelength from a multiple optical signal obtained by multiplexing a phase modulated signal and an intensity modulated signal and outputs the selected wavelength signal to a predetermined output port and the wavelength selection switch 300 has a different delay for each wavelength of the multiple optical signal. Therefore, because the delays of the phase modulated signal and the intensity modulated signal are not identical to each other and the same position of the phase modulated signal does not continue to be influenced by red chirp or blue chirp (the influence of red chirp or blue chirp is dispersed), the waveform degradation (XPM degradation) of the phase modulated signal can be prevented even if the phase modulated signal and the intensity modulated signal are wavelength-multiplexed.

[d] Fourth Embodiment

Figure 9:
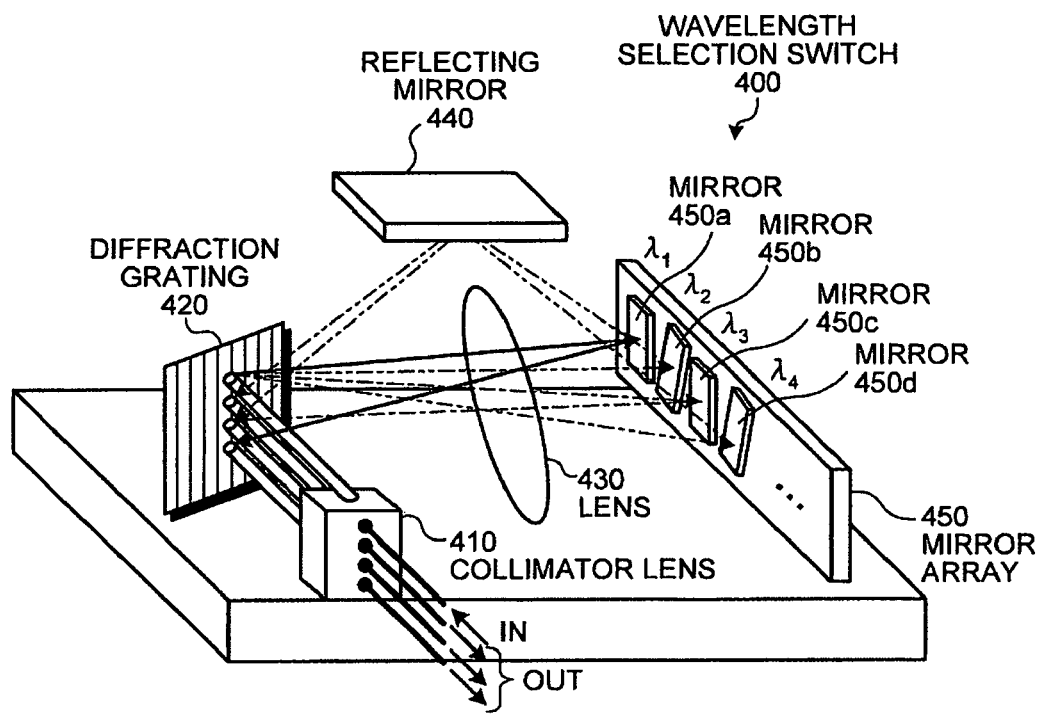
FIG. 9 is a diagram illustrating the configuration of a wavelength selection switch according to a fourth embodiment of the present invention.

Next, it will be explained about an OADM according to a fourth embodiment of the present invention. The OADM according to the fourth embodiment of the present invention includes a wavelength selection switch having the configuration different from that of the OADM illustrated in the first to third embodiments. FIG. 9 is a diagram illustrating the configuration of a wavelength selection switch 400 according to the fourth embodiment of the present invention. As illustrated in the present drawing, the wavelength selection switch 400 includes a collimator lens 410, a diffraction grating 420, a lens 430, a reflecting mirror 440, and a mirror array 450.

Among them, because the collimator lens 410, the diffraction grating 420, and the lens 430 are similar to the collimator lens 121, the diffraction grating 122, and the lens 123 illustrated in FIG. 5, their descriptions are omitted.

The reflecting mirror 440 receives the optical signals (for example, optical signals from the mirrors 450b and 450d or the mirrors 450a and 450c) having wavelengths corresponding to even channels (or odd channels) and outputs the received optical signals to the diffraction grating 420.

The mirror array 450 includes a plurality of mirrors 450a to 450d. The mirror array 450 is a device that controls the rotation angles of the mirrors 450a to 450d to switch output ports.

In an example illustrated in FIG. 9, the mirror 450a selects the output port of the optical signal having a wavelength $\lambda_1$. The mirror 450b selects the output port of the optical signal having a wavelength $\lambda_2$. The mirror 450c selects the output port of the optical signal having a wavelength $\lambda_3$. The mirror 450d selects the output port of the optical signal having a wavelength $\lambda_4$.

Particularly, in the wavelength selection switch 400 illustrated in the third embodiment of the present invention, by controlling the central angles of the mirrors (the mirrors 450b and 450d) for even channels or the central angles of the mirrors (the mirrors 450a and 450c) for odd channels, the difference is caused between optical paths from the mirrors for even channels to the diffraction grating 420 and optical paths from the mirrors for odd channels to the diffraction grating 420.

For example, a control unit (not illustrated) controls the central angles of the mirrors for even channels to set components in such a manner that the optical signals from the mirrors for even channels arrive at the diffraction grating 420 via the reflecting mirror 440 and holds the central angles of the mirrors for odd channels without change to set the components in such a manner that the optical signals from the mirrors for odd channels arrive at the diffraction grating 420 without passing through the reflecting mirror 440.

As illustrated in FIG. 9, by controlling the central angles of the mirrors for even channels or the mirrors for odd channels, the optical paths of the optical signals of even channels and the optical paths of the optical signals of odd channels are different, the delays between adjacent bits in the multiple optical signal are not identical to each other, and the waveform degradation of phase modulated signal can be prevented.

By applying the OADM including the wavelength selection switch 400 according to the fourth embodiment of the present invention to the wavelength division multiplexing transmission system, a Q penalty can be suppressed low even if an inline dispersion compensation ratio is 100% (see FIG. 6).

As described above, the OADM according to the fourth embodiment of the present invention has the wavelength selection switch 400 that selects a predetermined wavelength from a multiple optical signal obtained by multiplexing a phase modulated signal and an intensity modulated signal and outputs the selected wavelength signal to a predetermined output port and the wavelength selection switch 400 has a different delay for each wavelength of the multiple optical signal. Therefore, because the delays of the phase modulated signal and the intensity modulated signal are not identical to each other and the same position of the phase modulated signal does not continue to be influenced by red chirp or blue chirp (the influence of red chirp or blue chirp is dispersed), the waveform degradation (XPM degradation) of the phase modulated signal can be prevented even if the phase modulated signal and the intensity modulated signal are wavelength-multiplexed.

In addition, the wavelength selection switch 400 illustrated in FIG. 9 controls the central angles of the mirrors for even channels or the mirrors for odd channels and outputs the optical signals to the diffraction grating 420 via the reflecting mirror 440 in order to prevent the delays of adjacent optical signals from being identical to each other. However, the present invention is not limited to this. For example, by providing a mirror unit between the lens 430 and the mirror array 450, the optical signals from the mirrors for even channels or the mirrors for odd channels can be directed to the reflecting mirror 440 without controlling the central angles of the mirrors.

Figure 10:
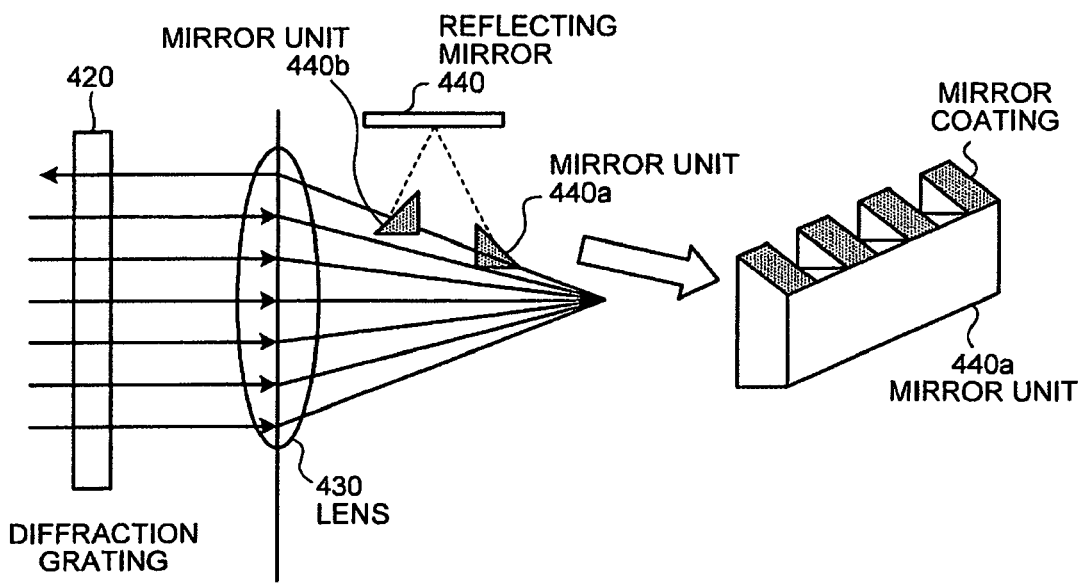
FIG. 10 is a diagram illustrating the other configuration of the wavelength selection switch.
Figure 11:
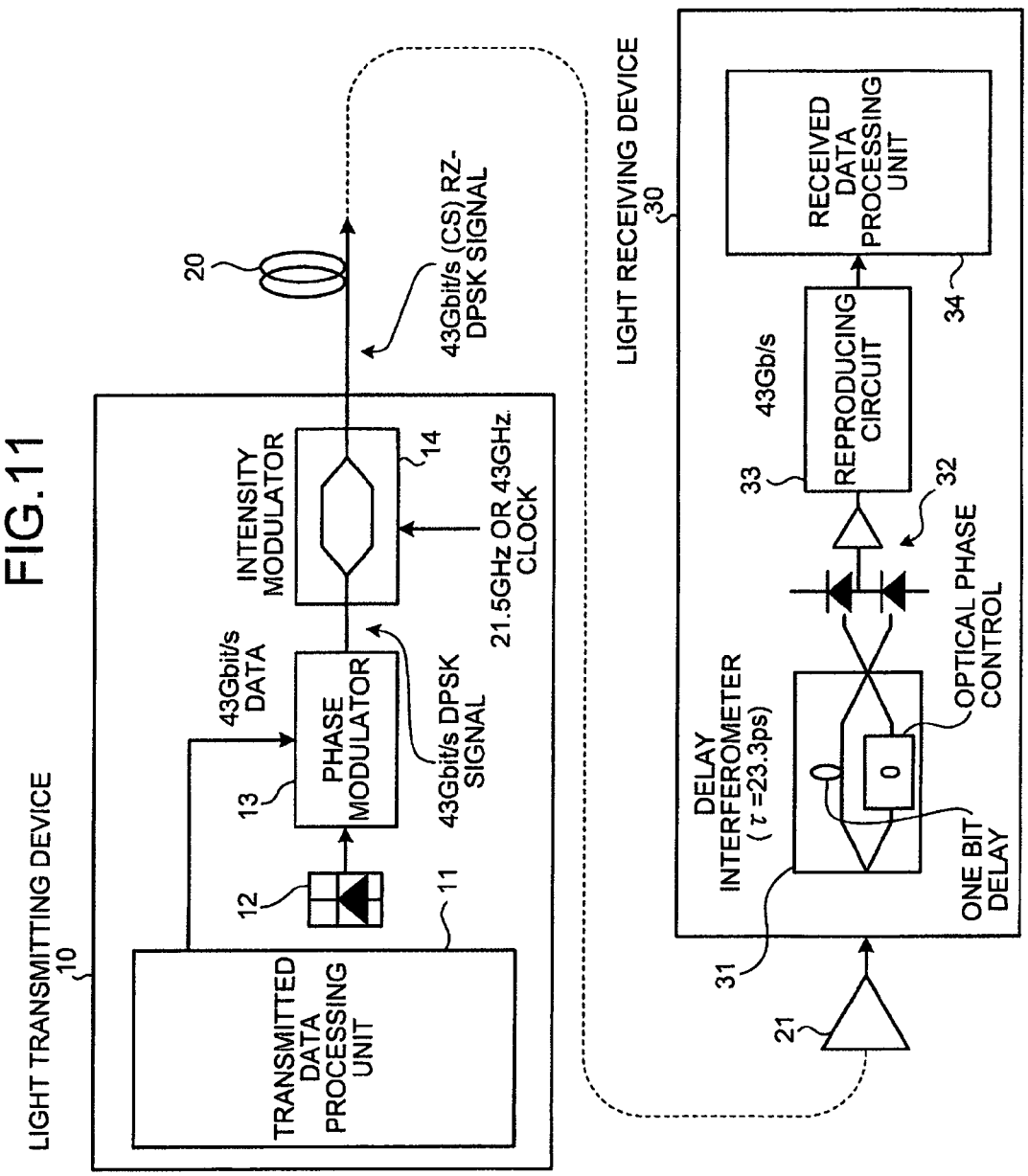
FIG. 11 is a diagram illustrating a configuration example of a light transmitting device and a light receiving device that employ a 43 Gbit/s RZ-DPSK or CSRZ-DPSK modulation method.
Figure 12:
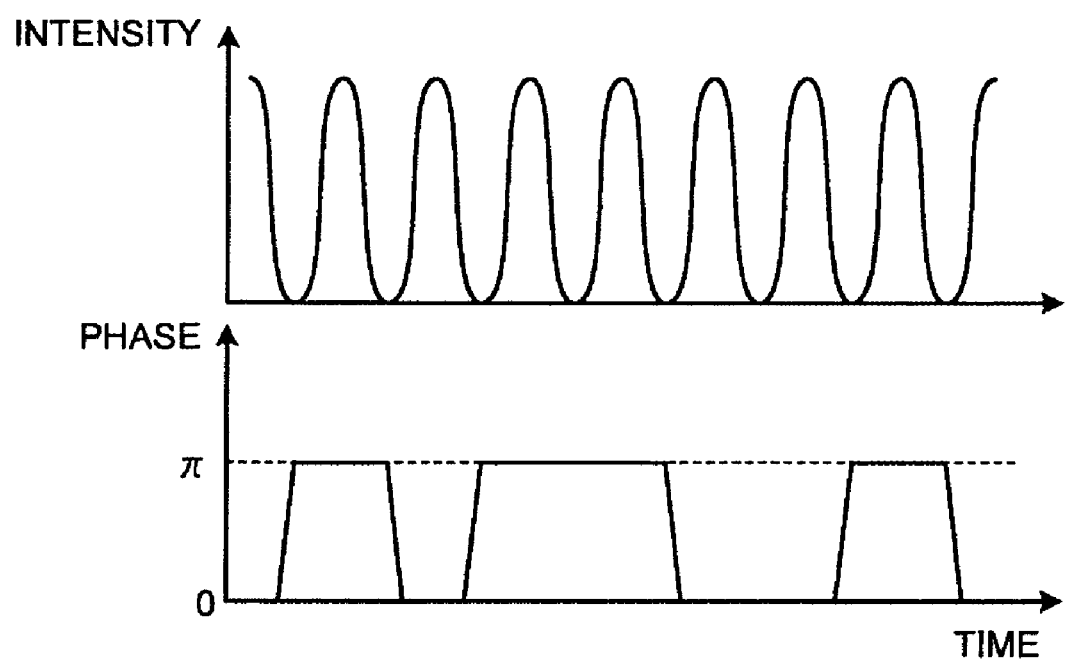
FIG. 12 is a diagram illustrating the states of a light intensity and an optical phase when an RZ-DPSK or CSRZ-DPSK modulated optical signal is transmitted and received.
Figure 13:
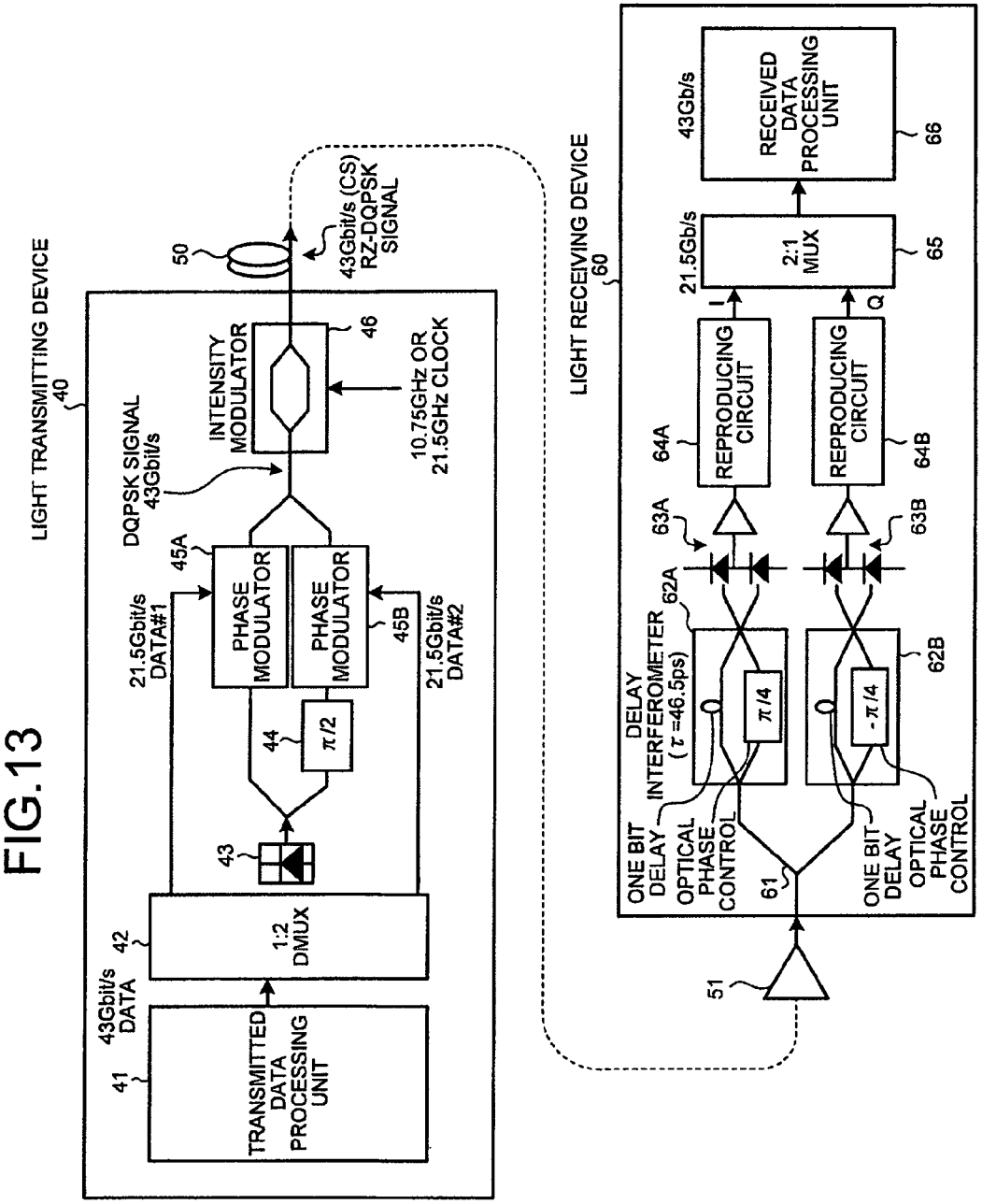
FIG. 13 is a diagram illustrating a configuration example of the light transmitting device and the light receiving device that employ a 43 Gbit/s RZ-DQPSK or CSRZ-DQPSK modulation method.
Figure 14:
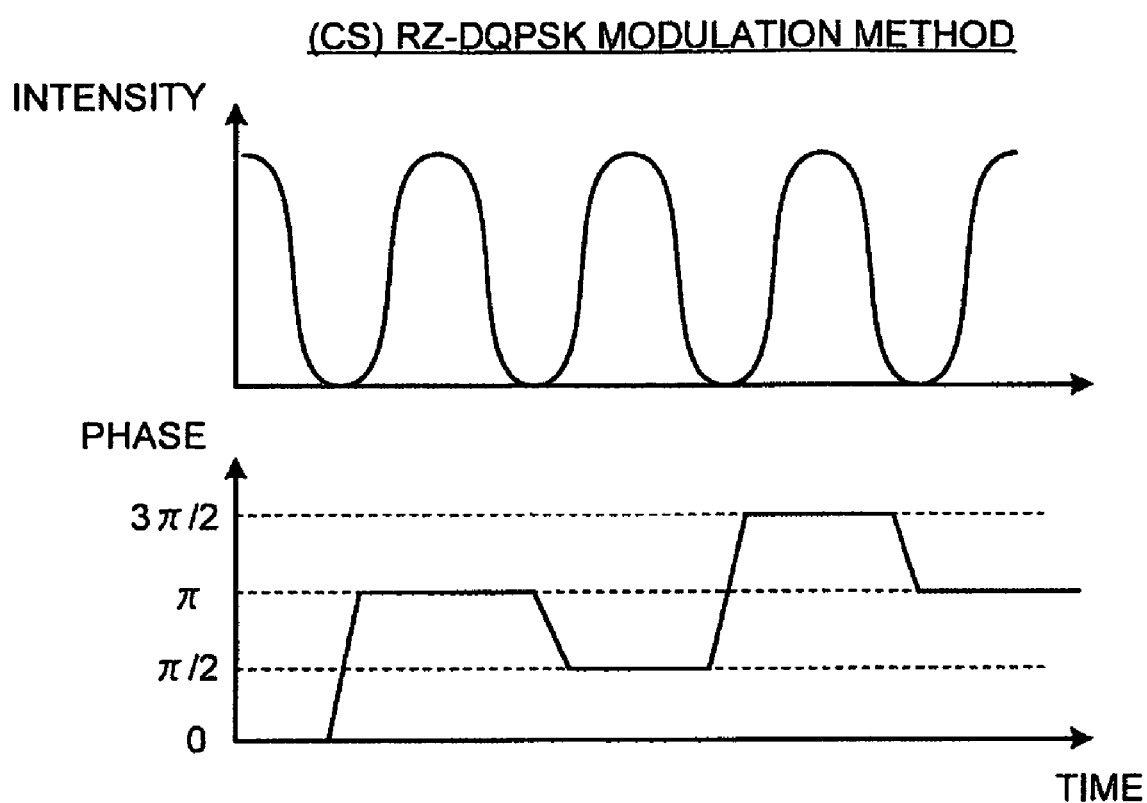
FIG. 14 is a diagram illustrating the states of a light intensity and an optical phase when an RZ-DQPSK or CSRZ-DQPSK modulated optical signal is transmitted and received.

FIG. 10 is a diagram illustrating another configuration of the wavelength selection switch 400. As illustrated in the present drawing, there are provided a mirror unit 440a that reflects optical signals having wavelengths corresponding to even channels or odd channels toward the reflecting mirror 440 and a mirror unit 440b that receives the optical signals reflected from the reflecting mirror 440 and reflects the received optical signals to the diffraction grating 420.

In FIG. 10, the right side thereof illustrates the configuration of the mirror unit 440a. When reflecting the optical signals having wavelengths corresponding to even channels toward the reflecting mirror 440, the mirror coatings of the mirror unit 440a are provided at the positions at which the optical signals from the mirrors 450b and 450d pass. In this case, the optical signals from the mirrors 450a and 450c arrive at the diffraction grating 420 without being reflected on the mirror units 440a and 440b.

On the other hand, when reflecting the optical signals having wavelengths corresponding to odd channels toward the reflecting mirror 440, the mirror coatings of the mirror unit 440a are provided at the positions at which the optical signals from the mirrors 450a and 450c pass. In this case, the optical signals from the mirrors 450b and 450d arrive at the diffraction grating 420 without being reflected on the mirror units 440a and 440b.

In this manner, by using the reflecting mirror 440 and the mirror units 440a and 440b, it is possible to prevent the delays of adjacent optical signals from being identical to each other without controlling the central angles of the mirrors 450a to 450d. Moreover, even if a phase modulated signal and an intensity modulated signal are wavelength-multiplexed, the waveform degradation (XPM degradation) of the phase modulated signal can be prevented.

Alternatively, it is possible to prevent the delays of adjacent optical signals from being identical to each other even when a saw-shaped transmission substrate (hereinafter, "substrate") is provided between the diffraction grating 71 and the MEM mirror array 73 of the wavelength selection switch 4b illustrated in FIG. 17.

Specifically, after the refractive indices of the positions at which the optical signals of even channels pass are previously adjusted on the substrate and the optical signals of even channels are multiple-reflected inside the substrate, the optical signals are output to the MEM mirror array 73. The optical signals corresponding to odd channels are not multiple-reflected inside the substrate and are output to the MEM mirror array 73. In this way, it is possible to prevent the delays of adjacent optical signals from being identical to each other.

On the contrary, after the refractive indices of the positions at which the optical signals of odd channels pass are previously adjusted on a substrate and the optical signals of odd channels are multiple-reflected inside the substrate, the optical signals are output to the MEM mirror array 73. The optical signals corresponding to even channels are not multiple-reflected inside the substrate and are output to the MEM mirror array 73. In this way, it is possible to prevent the delays of adjacent optical signals from being identical to each other.

Among the processes described in the first to fourth embodiments of the present invention, the whole or a part of the processes that are automatically performed can be manually performed. Alternatively, the whole or a part of the processes that are manually performed can be automatically performed in a well-known method.

Moreover, the wavelength selection switch illustrated in the first to fourth embodiments of the present invention is a functional and conceptual switch. Therefore, the wavelength selection switch does not necessarily have the physical configuration as illustrated. In other words, the specific configuration of dispersion/integration of each device is not limited to the illustrated configuration. The whole or a part of the specific configuration can be dispersed or integrated functionally or physically in an optional unit in accordance with various types of loads, the status of use, or the like.

In the first to fourth embodiments of the present invention, as an example, it has been explained about the principle of the wavelength selection switch based on a MEMS type. However, a liquid crystal wavelength selection switch as disclosed in Non-Patent Document (Glenn Baxter, "Highly programmable Wavelength Selective Switch based on Liquid Crystal on Silicon switching elements", OFC NFOEC 2006) can be utilized instead of the wavelength selection switch. In other words, a switching device array can be utilized instead of the mirror arrays (124, 240, 350, 360, and 450) explained in the embodiments. A switching device and the like can be utilized instead of the mirrors (124a, 124b, 124c, 124d, 124e, 124f, 240a, 240b, 240c, 240d, 240e, 350a, 350b, 350c, 360a, 360b, 360c, 450a, 450b, 450c, and 450d), the reflecting mirror 440, and the mirror units 440a and 440b.

In the first to fourth embodiments of the present invention, it has been explained about a mixed system of a phase modulation method and an intensity modulation method. However, the present invention is not limited to this. The wavelength selection switch explained in the first to fourth embodiments can be applied to a wavelength division multiplex system for only an intensity modulation method.

Because waveform degradation caused by cross phase modulation (XPM) is conspicuously seen in a mixed system, the present invention has a large effect in the mixed system. On the other hand, because waveform degradation caused by cross phase modulation (XPM) slightly occurs even in a wavelength division multiplex system (for example, a 10 Gbit/s NRZ-signal wavelength division multiplex) for only an intensity modulation method, waveform degradation can be suppressed by applying the wavelength selection switch according to the present invention to the wavelength division multiplex system.

According to an embodiment of the present invention, the optical signal processing apparatus includes a wavelength selection switch that selects a predetermined wavelength from a multiple optical signal that is obtained by multiplexing an optical signal (a phase modulated signal) obtained by a first modulation method and an optical signal (an intensity modulated signal) obtained by a second modulation method and outputs the selected wavelength signal to a predetermined output port. Because the wavelength selection switch has a delay different for each wavelength of the multiple optical signal, the delay of the phase modulated signal and the intensity modulated signal is not identical to each other and the same position of the phase modulated signal does not continue to come under the influence of red chirp or blue chirp (the influence of red chirp or blue chirp is dispersed). Therefore, it is possible to prevent the waveform degradation (XPM degradation) of the phase modulated signal even if the phase modulated signal and the intensity modulated signal are wavelength-multiplexed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical signal processing apparatus comprising:
    a wavelength selection switch configured to select predetermined wavelengths from a multiple optical signal, the multiple optical signal being obtained by wavelength-multiplexing a first optical signal modulated by a phase modulation method and a second optical signal modulated by an intensity modulation method, and output optical signals respectively having the predetermined wavelengths to predetermined output ports, wherein
    the wavelength selection switch has different delays for the predetermined wavelengths, and
    a difference between the different delays is set according to transmission speed of the second signal.

2. The optical signal processing apparatus according to claim 1, wherein
    the wavelength selection switch includes
        a diffraction grating configured to separate the multiple optical signal for each of the predetermined wavelengths to obtain the optical signals respectively having the predetermined wavelengths; and
        a switching device array configured to include a plurality of switching devices respectively configured to reflect the obtained optical signals and switch the predetermined output ports respectively configured to output the obtained optical signals by controlling angles thereof, and distances from the diffraction grating to the switching devices of the switching device array are different, and
        a difference between the different distances is set according to the transmission speed of the second signal.

3. The optical signal processing apparatus according to claim 2, wherein the switching devices on the switching device array are arranged in the shape of saw.

4. The optical signal processing apparatus according to claim 2, wherein the switching devices on the switching device array are arranged in the shape of stairway.

5. The optical signal processing apparatus according to claim 2, wherein
    the switching device array is a mirror array, and
    the switching device is a mirror.

6. The optical signal processing apparatus according to claim 1, wherein
    the wavelength selection switch includes
        a diffraction grating configured to separate the multiple optical signal for each of the predetermined wavelengths to obtain the optical signals respectively having the predetermined wavelengths;
        a plurality of switching device arrays configured to each include a plurality of switching devices respectively configured to reflect the obtained optical signals and switch the predetermined output ports respectively configured to output the obtained optical signals by controlling angles thereof; and
        a separation switching device configured to divide the obtained optical signals and reflect the divided optical signals toward the switching device arrays,
    distances from the diffraction grating to the plurality of switching device arrays are different, and
    a difference between the different distances is set according to the transmission speed of the second signal.

7. The optical signal processing apparatus according to claim 6, wherein
    the switching device array is a mirror array, and
    the switching device is a mirror.

8. The optical signal processing apparatus according to claim 1, wherein
    the wavelength selection switch includes
        a diffraction grating configured to separate the multiple optical signal for each of the predetermined wavelengths to obtain the optical signals respectively having the predetermined wavelengths;
        a switching device array configured to include a plurality of switching devices respectively configured to reflect the obtained optical signals and switch the predetermined output ports respectively configured to output the obtained optical signals by controlling angles thereof; and
        a fixed switching device configured to reflect the obtained optical signals from the switching device array to the diffraction grating, and
    the switching device array controls central angles of the plurality of switching devices to output an optical signal having one wavelength of adjacent wavelengths of the multiple optical signal to one of the predetermined output ports via the fixed switching device.

9. The optical signal processing apparatus according to claim 8, wherein
    the switching device array is a mirror array, and
    the switching device is a mirror.

10. The optical signal processing apparatus according to claim 1, wherein
    the wavelength selection switch includes
        a diffraction grating configured to separate the multiple optical signal for each of the predetermined wavelengths to obtain the optical signals respectively having the predetermined wavelengths;
        a switching device array configured to include a plurality of switching devices respectively configured to reflect the obtained optical signals and switch the predetermined output ports respectively configured to output the obtained optical signals by controlling angles thereof; and
        a switching device unit configured to output one optical signal of optical signals having adjacent wavelengths among the obtained optical signals from the switching device array to one of the predetermined output ports via a fixed switching device.

11. The optical signal processing apparatus according to claim 10, wherein
    the switching device array is a mirror array, and
    the switching device is a mirror.

12. The optical signal processing apparatus according to claim 1, wherein the wavelength selection switch includes a diffraction grating configured to separate the multiple optical signal for each of the predetermined wavelengths to obtain the optical signals respectively having the predetermined wavelengths;

a switching device array configured to include a plurality of switching devices respectively configured to reflect the obtained optical signals and switch the predetermined output ports respectively configured to output the obtained optical signals by controlling angles thereof; and a substrate configured to multiple-reflect only an optical signal corresponding to one wavelength of adjacent wavelengths and then transmits the multiple-reflected optical signal.

13. The optical signal processing apparatus according to claim 12, wherein the switching device array is a mirror array, and
the switching device is a mirror.

* * * * *